G. R. WYMAN.
METHOD OF HEATING WATERPROOFING MATERIAL AND SUPPLYING THE SAME TO PAPER.
APPLICATION FILED JUNE 17, 1915.
1,165,367.
Patented Dec. 21, 1915.
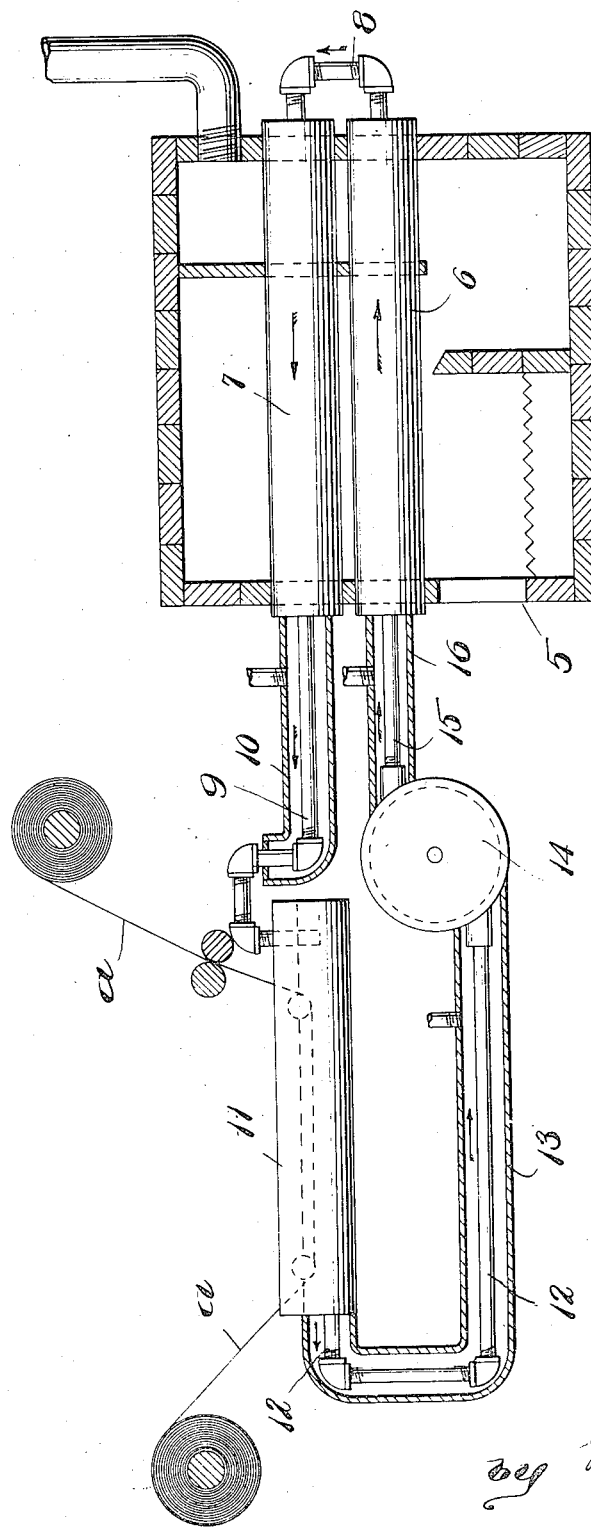
Inventor
George R. Wyman.
by
Henry J. Miller
atty.

UNITED STATES PATENT OFFICE.

GEORGE R. WYMAN, OF EAST WALPOLE, MASSACHUSETTS, ASSIGNOR TO CHARLES S. BIRD, OF EAST WALPOLE, MASSACHUSETTS.

METHOD OF HEATING WATERPROOFING MATERIAL AND SUPPLYING THE SAME TO PAPER.

1,165,367.  Specification of Letters Patent.  Patented Dec. 21, 1915.

Application filed June 17, 1915. Serial No. 34,728.

*To all whom it may concern:*

Be it known that I, GEORGE R. WYMAN, a citizen of the United States, residing at East Walpole, in the county of Norfolk and State of Massachusetts, have invented a new and Improved Method of Heating Waterproofing Material and Supplying the Same to Paper, of which the following is a specification, reference being had to the accompanying drawings, forming part thereof.

This invention has reference to an improved method for supplying heated waterproofing material as fluid to a pan or bath in which said material is supplied to paper.

One object of the invention is to so heat waterproofing material containing oil or asphaltum that danger of ignition of the fluid material is avoided by the fact that the temperature of the walls of the pan cannot be raised above the temperature of the fluid supplied to said pan.

Another object of the invention is to so heat waterproofing material that the temperature of the fluid in the pan is approximately uniform throughout whereby the fluid is maintained at a temperature at which its absorption or taking up by the roofing material or other material in the passing of such material through or in contact with such fluid is facilitated thus permitting the more rapid movement of the material and increasing the production.

Other objects of the invention will appear from the following description.

The invention consists in the improved method of heating waterproofing material and supplying the same to paper.

The drawing represents a side elevation of an apparatus for carrying out the improved method.

It has heretofore been the custom to heat and render fluid water or weather proofing material having or containing oils and asphaltum in some proportion or material of any kind which it is found desirable to apply in a heated condition. Heretofore some kinds of such materials containing asphaltum and oil or oily substance have been placed in a large iron pan or container having an open top and subjected to heat applied directly to the pan, usually from a fire beneath the pan, with the result that the walls of the pan were first heated and such heated material was then transmitted to the material within the pan. In such operation it was of course necessary to maintain the walls of the pan at a temperature somewhat higher than the temperature of the material within the pan and while the temperature of said material could be raised to the desired temperature with some degree of safety, under normal conditions, it has been found that if the supply or level of fluid material in the pan was lowered to a point at which the sides of the pan were heated to a degree to create a spark, the gases of the material would ignite and the entire material in the pan would take fire. In the use of such apparatus danger of igniting the contents of the pan is also caused by the possible ignition of drippings or overflow of the material.

In the application of waterproofing material containing asphaltum or some similar substance it is of course desirable to expedite the operation as much as possible without reducing the quality of the finished product. The process of such application consists in taking a long strip or web of paper or paper felt and passing said strip through a bath of the waterproof compound which is rendered fluid by the presence of heat. The higher the temperature of the waterproofing compound and thus the greater its fluidity the more readily is such compound taken up by the paper and the more readily does the surplus compound drain from the paper. Under the method heretofore employed the danger of igniting the waterproofing compound was such that it has been found impractical to heat the same to the flashing point while it is readily understood that such material, in the absence of ignition, can be utilized with comparative safety at a temperature above the flashing point.

As shown in the drawings 5 indicates a furnace or other heat supplying means adapted to maintain a high temperature at and around the parallel horizontal drums 6 and 7 which are connected by the pipe 8. From the drum 7 extends the supply pipe 9 which has the steam jacket 10 and extends to a point distant from the furnace 5 where it delivers to the pan or receptacle 11 which is or may be of any suitable size, shape and construction to receive fluid from pipe 9 and to supply said fluid to paper or other material a—a circulated in contact with the waterproofing in said pan in any well known manner.

From the pan 11 at a point preferably diametrically opposite the location of pipe 9 extends the return pipe 12 which has the steam jacket 13 and communicates with the steam jacketed pump 14 which in turn is connected by the pipe 15 having the steam jacket 16 with the drum 6.

In the operation of the apparatus the material to be heated is supplied to the pan 11 in a condition of fluidity so that it may pass through pipe 12 to the pump 14 by which said material is forced through pipe 15 into drum 6 and passes thence through pipe 8 to drum 7 until both of said drums are completely filled with said material. Heat is now applied to said drums 6 and 7 until the material therein is raised to the desired temperature after which pump 14 operates continually to force forward material to the drum 6 which material is heated and passing into drum 7 through pipe 8 forces the heated material from said drum 7 through pipe 9 into the pan 11. The heated material circulates constantly through said pan 11 and is drawn therefrom through pipe 12 by the pump and returned through the system of pipes and drums for reheating. As the drums 6 and 7 are kept completely filled with the fluid material at all times during the heating process and air is excluded there is no danger of igniting such material and, hence, the temperature of said material can safely be maintained at a higher point than has been practical heretofore. I find also that the continuous supply of heated material to the pan 11 maintains the temperature of the fluid therein so that said material is more readily taken up by the paper passed through said pan and is more readily absorbed into said paper while the drainage of surplus waterproofing material from the paper back into the pan makes the process economical.

The waterproofing material usually contains some impurities which under temperatures heretofore used do not become sufficiently fluid or distributed through the waterproofing material to be taken up by the paper. Ultimately such impurities accumulate to such an extent in the pan that the machine must be shut down and the pan cleaned of such waste material. In the actual operation of this improved method I find that at the high temperature, at which the waterproofing material is supplied to the paper, practically all of the constituents of the waterproofing material are taken up by the paper so that the stopping of the machine for the cleaning out of the pan is not necessary during the run and that, practically, there is no waste.

Having thus described my invention I claim as new and desire to secure by Letters Patent—

That method of heating waterproofing having a flashing point and supplying the same to material, which consists in heating said waterproofing approximately to its flashing point, while excluding air therefrom, and supplying such heated waterproofing to material to be treated.

GEORGE R. WYMAN.